United States Patent

Nobusawa et al.

[11] Patent Number: 6,066,685
[45] Date of Patent: May 23, 2000

[54] METHOD FOR TREATING PLASTICS AND SOLID FUEL OBTAINED BY THE SAME METHOD

[75] Inventors: Tatsuya Nobusawa; Toshihide Suzuki, both of Chiba; Kimihiro Nishimura, Kurashiki; Makiko Ijiri; Masahiko Tada, both of Chiba; Masafumi Komatsu, Tokyo, all of Japan

[73] Assignee: Kawasaki Steel Corporation, Kobe, Japan

[21] Appl. No.: 09/132,704

[22] Filed: Aug. 12, 1998

[30] Foreign Application Priority Data

Aug. 13, 1997 [JP] Japan ................................. 9-218427
Feb. 10, 1998 [JP] Japan ................................. 10-028991

[51] Int. Cl.[7] ........................................................ C08J 3/02
[52] U.S. Cl. .............................. 523/332; 524/66; 524/567
[58] Field of Search ............................... 523/332; 524/66, 524/567

[56] References Cited

FOREIGN PATENT DOCUMENTS

| | | |
|---|---|---|
| 52-22672 | 6/1977 | Japan . |
| 52-038594 | 9/1977 | Japan . |
| 52-38594 | 9/1977 | Japan . |
| 56 036594 | 9/1977 | Japan . |
| 57-16160 | 4/1982 | Japan . |
| 7-179651 | 7/1995 | Japan . |
| 7-207279 | 8/1995 | Japan . |
| 8-081685 | 3/1996 | Japan . |
| 8-81686 | 3/1996 | Japan . |
| 9-208738 | 8/1997 | Japan . |
| WO 94/06854 | 3/1994 | WIPO . |

*Primary Examiner*—Kriellion Sanders
*Attorney, Agent, or Firm*—Oliff & Berridge, PLC

[57] ABSTRACT

A method for treating plastics, which is feasible on plastics containing films mixed therein, which is capable of performing dehydrochlorination simultaneously, and which provides processed plastics capable of being easily size-reduced. The method includes mixing the plastics with an organic solvent at a temperature not lower than 150° C.; allowing the plastics to dissolve and/or swell; removing the organic solvent or both the organic solvent and low-boiling point components from the treated solution thereafter; and solidifying the resulting product. The method can produce solid fuels and reducing agents for ores.

31 Claims, No Drawings

METHOD FOR TREATING PLASTICS AND SOLID FUEL OBTAINED BY THE SAME METHOD

BACKGROUND OF THE INVENTION

1. Field of the Invention

The present invention relates to a method for treating plastics, which enables producing processed plastics that can be readily reduced in size. It also relates to a method for treating plastics, which is capable of converting plastics, including chlorine-containing plastics such as poly(vinyl chloride), into plastics substantially free from chlorine. It further relates to a solid fuel and a reducing agent for ores obtained from the same method for treating plastics.

2. State of the Art

Recently, a method of producing solid fuel from waste plastics has been developed as a solution for overcoming the problem of effectively using waste plastics. This method is based on the fact that the flammability of plastics drastically increases when it is finely pulverized, and that it becomes a useful fuel resource.

The technology of converting plastics into a solid fuel comprises, as is reported in, for instance, Plastics, Vol.47, No. 7, page 60, directly size-reducing plastics by using a grinding machine.

However, the method described above suffers problems. For instance, in the case of hard plastics, their size reduction not only is limited to a granularity of about 1 to 2 mm, but also consumes much time and cost. In the case of fibrous and film plastics, grinding thereof is difficult, and hence, they require complicated process steps including melting and solidifying them separately before subjecting them to grinding. Moreover, in these cases, it is also necessary to remove insoluble matters such as glasses and metals before grinding.

Moreover, plastics containing chlorine, such as poly(vinyl chloride), generates a harmful substance, i.e., hydrogen chloride, when combusted. When subjecting these plastics to a heat treatment, they must be treated separately from other plastics because they generate gaseous hydrogen chloride which causes corrosion of vessels and piping. Thus, they require a separate heat treatment and the like to remove hydrogen chloride therefrom.

In the light of the aforementioned circumstances, a method of treating plastics using a solvent has been proposed.

More specifically, JP-B-Sho.57-16160 and JP-B-Sho.52-38594 (the term "JP-B-" referred herein signifies "an examined published Japanese patent application") disclose a method of treating plastics in petroleum or mineral oils.

However, the solids obtained by the method disclosed in the references above are in a swelled state, and are difficult to grind into fine particles. Moreover, the solid products thus obtained have been found to be apt to agglomerate during grinding or after grinding, and are likely to cause clogging of piping during their transportation from the site of grinding to the site of burning.

Thus, currently known methods have failed to provide a fine powder of solid fuel having excellent combustibility that can be easily handled.

Furthermore, a method of regenerating poly(vinyl chloride) which comprises dissolving waste poly(vinyl chloride) into a solvent and removing the solvent thereafter is disclosed in International Patent Publication No. W 094/06854. Because the object of this method is to regenerate poly(vinyl chloride), the treatment is performed at low temperatures so that dehydrochlorination does not occur, and that the structure of poly(vinyl chloride) is retained.

Accordingly, the regenerated material produced according to W 094/06854 is not suitable for use as a solid fuel, because, for instance, it contains chlorine, and does not grind well due to the low temperature treatment.

Also known is a technique for mixing waste plastics with a solvent and subjecting the resulting mixture to a decomposition reaction so as to finally obtain the plastics in the form of liquid fuel or gas (reference is made to JP-B-Sho.52-22672, JP-A-Hei.7-207279, and JP-A-Hei.8-81685, where, the term "JP-A-" as referred herein signifies "an unexamined published Japanese patent application"). However, this method is not a technique for producing solid fuel.

SUMMARY OF THE INVENTION

The present invention aims to overcome the problems described above. An object of the present invention is to provide a method for treating plastics, which enables the production of processed plastics that can be readily reduced in size, yet is capable of effecting dehalogenation, such as dehydrochlorination treatment at the same time, and which is also feasible on products containing films. Also included in the invention is to provide solid fuel and a reducing agent for ores by using the method for treating plastics.

In the course of studying various methods for achieving the objects described above, the present inventors have discovered that, by mixing plastics with at least one organic solvent at a temperature not lower than about 150° C., at least some of the chemical bonds of the plastics can be cut by the heat and the effect of the organic solvent(s). Further, by removing the organic solvent(s) and any low boiling-point component, such as a plasticizer, that result from the heating process, the plastics can be converted into a treated plastic product which can be readily ground. The present invention has been achieved based on these findings.

In accordance with the present invention, dehydrochlorination can be performed at the same time as the treatment step. Accordingly, chlorine-containing plastics such as poly(vinyl chloride) can be treated together with plastics of differing types.

Thus, in cases where the processed plastics obtained by the method according to the present invention are utilized as solid fuel and the like, there is no fear of generating hydrogen chloride.

More specifically, in accordance with a first aspect of the present invention, there is disclosed a method for treating plastics, which comprises mixing the plastics with at least one organic solvent at a temperature not lower than about 150° C.; allowing the plastics to dissolve and/or swell; removing the organic solvent(s), or both the organic solvent(s) and any low-boiling point component released as a result of heating of the plastics, from the treated solution thereafter; and solidifying the resulting product.

According to a second aspect of the present invention, there is disclosed a method for treating plastics, which comprises mixing the plastics with at least one organic solvent at a temperature not lower than about 150° C.; allowing the plastics to dissolve and/or swell; removing the insoluble portion from the resulting treated solution; removing the organic solvent(s), or both the organic solvent(s) and any low-boiling point component released as a result of heating of the plastics, from the treated solution thereafter; and solidifying the resulting product.

In accordance with a third aspect of the present invention, there is disclosed a method for treating plastics, comprising mixing the plastics with at least one organic solvent at a temperature not lower than about 150° C.; allowing the plastics to dissolve and/or swell; removing the organic solvent(s) or both the organic solvent(s) and any low-boiling point component released as a result of heating of the plastics, from the treated solution; removing the insoluble portion from the resulting treated solution thereafter; and solidifying the resulting product.

In a preferred embodiment of the first to the third aspects described above, during the process of removing the organic solvent(s) or both the organic solvent(s) and any low-boiling point component released as a result of heating of the plastics from said treated solution, a half or more by weight of the organic solvent(s) retained in the reaction vessel is removed.

In another preferred embodiment, in the first to the third aspects described above, the treated solution obtained by removing the organic solvent(s), or both the organic solvent (s) and any low-boiling point component released as a result of heating the plastics, therefrom is cooled for solidification from the treatment temperature at the time of removal to about 100° C. or lower within about 10 minutes after starting cooling.

In another preferred embodiment, in the first to the third aspects described above that, the method comprises grinding the solid product obtained by any one of the methods disclosed in the first to third aspects.

In another preferred embodiment, in the first to the third aspects described above, the organic solvent is at least one type selected from the group consisting of a coal-based tar, a distilled product obtained from coal-based tar, and a petroleum-based organic solvent.

In a more preferred embodiment, the distilled product obtained from coal-based tar is at least one product selected from the group consisting of crude naphtha oil, naphthalene wash oil, creosote oil, and anthracene oil.

In a more preferred embodiment the petroleum-based organic solvent is at least one solvent selected from the group consisting of A oil, C oil, gas oil, fuel oil, heavy oil and kerosene.

The method of the invention can be successfully applied to a wide range of plastics, including chlorine-containing plastics.

A fourth aspect of the present invention is a solid fuel made from processed plastics obtained by a method of treating plastics described in any one of the above aspects and embodiments of the invention.

A further aspect of the present invention is a reducing agent for ores (products) made of processed plastics obtained by the method of treating plastics described in any one of the aspects and embodiments described above.

DETAILED DESCRIPTION OF THE PREFERRED EMBODIMENTS

The present invention is described in further detail below by specifically referring to the following points according to the present invention in the order of (1) Plastics, (2) Organic solvents, (3) Mixing and heating processes of plastics with organic solvents, (4) Removal of organic solvents, low boiling-point components, and insoluble matter, (5) Cooling and solidification, and (6) Size reduction process.
(1) Plastics The plastics that are the object of the present invention include not only virgin plastics, but also any other plastic materials, including, but not limited to, waste plastics, wrapping materials and trays incorporated in municipal garbage and industrial wastes, as well as waste plastics that are generated from scraps of electric appliances, automobiles, and the like.

More specifically, the present invention is applicable to all types of plastics, i.e., polyolefins such as polyethylene and polypropylene, poly(vinyl chloride), polystyrene, polyethylene terephthalate, polycarbonate, nylon, etc., and other thermoplastic resins and thermosetting resins. The present invention can be applied to a single type of plastic, including, but not limited to, those listed above, or to mixtures of two types or more.

According to the present invention, in particular, halogen elements, such as chlorine, that are incorporated in the plastics can be easily separated because they form hydrogen halides, such as hydrogen chloride, during the process according to the invention. Thus, chlorine-containing plastics, such as poly(vinyl chloride) and poly(vinylidene chloride), are also included in the plastics according to the present invention.

Thus, the present invention is extremely advantageous for processing waste plastics because there is no need to separate the waste plastics based on type.

Furthermore, by carrying out the treatment in accordance with the present invention, a treated plastic product substantially free of halogen elements such as chlorine can be obtained.

Concerning the shape and the size of the plastics for use in the present invention, coarsely crushed materials about 100 cm$^2$ in size suffice the requirements of the present invention. Accordingly, generally available waste plastics need not be crushed again, but they can be treated as-collected. Films, sheets, and fibrous plastics can also be treated as they are. Thus, the present invention provides the advantage of being able to treat plastics with less expense and manipulation than is currently possible.

Although plastics reduced in size surely dissolve more rapidly into a solvent, it should be noted that the cost for crushing therefor increases. Thus, the reduction in the need to finely divide the plastics prior to treatment is an advantage of the present invention.
(2) Organic solvents So long as it dissolves and/or swells plastics, there is no limitation concerning the type of organic solvents for use in the present invention.

However, those having a boiling point of not lower than 150° C. are preferred because they are heated to 150° C. or higher in the heat treatment of the plastics.

When using a mixed type organic solvent such as a mixture of coal-based tar and/or distillate of coal-based tar as is described hereinafter, it is preferred to use a mixture having about a 10% by weight distill temperature of about 150° C. or higher.

Still, solvents having a boiling point lower than about 150° C. can also be used at about 150° C. or higher and under pressure.

Coal-based tar and/or distilled product of coal-based tar can be preferably used among the organic solvents, since they have a boiling point falling within a desired range and excellent solubility.

More specifically, preferred are coal-based tar and distilled products of coal-based tar, such as crude naphtha oil, naphthalene wash oil, creosote oil, and anthracene oil.

The solvents can be used either singly, or as a mixture of two or more.

Evolution of hydrogen chloride from poly(vinyl chloride) generally occurs at a temperature of about 250° C. or higher, but when coal-based tar and/or distillates of coal-based tar are used as the solvent, dehydrochlorination occurs at a temperature of about 200° C. or lower.

Furthermore, crude naphtha oil is particularly preferred because it dissolves almost all types of plastics inclusive of poly(vinyl chloride), and because it yields a high rate of dechlorination at temperatures of about 200° C. or lower.

Also preferred as the organic solvent(s) for use in the present invention are the petroleum-based organic solvents.

Although any petroleum-based organic solvent can be used, it is preferred to use one type or more selected from the group consisting of A oil, C oil, gas oil, fuel oil, heavy oil and kerosene. The reason why they are preferred is that the use of the petroleum-based organic solvents specified above further decreases the chlorine concentration of the resulting treated plastic products.

In the method according to the present invention, coal-based tar and/or distillate of coal-based tar can be mixed with a petroleum-based organic solvent.

(3) Mixing and heating processes of plastics with organic solvents

In the method according to the present invention, the plastics is mixed with at least one organic solvent at a temperature of about 150° C. or higher.

The mixing ratio by weight of the organic solvent(s) to the plastics in the mixture of plastics and organic solvent(s), i.e., the organic solvent/plastics ratio by weight, is preferably in a range of from about 0.1 to about 10, and more preferably, in a range of from about 0.5 to about 5.

As the weight ratio decreases to a value below 1.0, the viscosity of the system begins to increase. This makes the handling of the system more difficult, and moreover, dehydrochlorination tends to be suppressed as well. Thus, although the method will work at very low ratios, it is preferred, from a practical standpoint, to maintain the ratio at 0.1 or higher.

On the contrary, if the weight ratio should exceed about 10, disadvantages are encountered. At these ratios, the size of the reaction vessel becomes very large and the distillation cost for removing the organic solvent(s) from the processed plastics renders the process less economically advantageous.

There is no particular limitation concerning the method for mixing the plastics with an organic solvent(s) at a temperature of about 150° C. or higher.

For instance, the plastics can be mixed with the organic solvent(s) at room temperature, and the mixture can then be heated or elevated in temperature to about 150° C. or higher, or, either of the plastics or the organic solvent(s), or both, can be heated and elevated in temperature to about 150° C. or higher, and mixing can be performed thereafter.

The mixed system thus obtained by mixing the plastics and the organic solvent(s) may be a homogeneous system (all is dissolved), or a heterogeneous state (swelled state) in which a part thereof remains undissolved.

By heating the plastics to a temperature of 150° C. or higher in the presence of at least one organic solvent, the plastic polymer molecules are separated from each other, at least partially, permitting at least partial cleavage of cross-linking and backbone bonds. The strength of the solid matter after removing the solvent is thus reduced. This permits the resulting treated plastic product to be easily pulverized into a fine powder.

If the temperature of the system in mixed state should be lower than about 150° C., the hardness of the solid product obtained after removing the solvent(s) remains the same as that of the original plastics. Hence, it is difficult to reduce its size into fine powder.

On the contrary, if the temperature of the system in the mixed state exceeds about 450° C., the yield of the solid product decreases due to gasification and liquefaction of the plastics.

Thus, the temperature of the mixed system of plastics and organic solvent(s) is fixed at about 150° C. or higher, but preferably, the upper limit is set at about 450° C.; more preferably, the temperature is in a range of from about 160 to 400° C., and most preferably, it is in a range of from about 180 to about 380° C.

To effect dechlorination from chlorine-containing plastics such as poly(vinyl chloride) and poly(vinylidene chloride), and to generate hydrogen chloride, the temperature at mixed state is required to be about 150° C. or higher.

If the temperature of the system in mixed state is lower than about 150° C., the rate of reaction for dechlorination is too low to make the process practical. Accordingly, the temperature is preferably 150° C. or higher.

On the other hand, as stated above, if the temperature of the system in mixed state is too high, the yield of the solid product decreases due to gasification and liquefaction of the plastics. Accordingly, the temperature is preferably 450° C. or lower.

Once the mixture of plastics with organic solvent is prepared at a mixed state at about 150° C. or higher, it is preferred that this state is maintained for a predetermined duration of time at a temperature of about 150° C. or higher.

Furthermore, it is preferred, although not required, that the solvent(s) is refluxed during this process.

A longer time of retention at the temperature of about 150° C. or higher is preferred because the dehydrochlorination can be effected more surely with increasing time, and because the solid product obtained after removing the solvent(s) becomes more brittle.

However, if the time of retention becomes too long, decomposition and gasification proceed as to cause problems such as a decrease in the yield of the target solid product and a decrease in processing capacity of the facility.

Thus, the time for maintaining the temperature at about 150° C. or higher is preferably in a range of from about 10 minutes to about 6 hours, and more preferably, in a range of from about 30 minutes to about 3 hours.

The process steps to realize the mixed state may be achieved by separately carrying out the mixing step and the heating step, or they can be effected sequentially by using the same vessel. As a matter of fact, it is more economical to effect the process steps continuously.

Thus, the process steps above can be effected by a batch process or a continuous process.

(4) Removal of organic solvents, low boiling-point components, insoluble matter

In the present invention, the organic solvent(s) or both the organic solvent(s) and any low boiling-point component are removed from the heat treated product (i.e., the treated solution or the mixed solution) obtained in the mixing and heating process steps above.

Furthermore, in the present invention, it is more preferred to remove the insoluble matter from the heat treated product (i.e., the treated solution or the mixed solution) obtained in the mixing and heating process steps above, and to remove additionally the organic solvent(s) or both the organic solvent(s) and any low boiling-point component therefrom.

By removing the organic solvent(s) or both the organic solvent(s) and the low boiling-point component in accordance with the present invention, the resulting treated plastic product can be ground extremely easily, and the ground product becomes less apt to cause secondary coagulation.

Furthermore, according to the present invention, processed plastics having very low chlorine content can be obtained by removing the insoluble matter from the aforementioned heat treated product.

The removal of the organic solvent(s) and the low boiling-point component can be performed by known methods including, but not limited to, distillation and drying. A simple single distillation is feasible in the case where distillation is employed, and can be effected either by a batch process or a continuous process.

In either of the cases described above, a pitch-like residue is formed. The pitch-like residue can be removed by any known proper method, and cooled thereafter to obtain the targeted solid product. The distillation temperature is preferably in a range of from about 150 to about 400° C.

Although, among other techniques, both atmospheric distillation and vacuum distillation can be employed, the latter is preferred over the former because the removal efficiency of the low boiling-point component is higher. In this case, it is more preferred that the vacuum distillation is carried out under pressure conditions such that the circumferential pressure of the material to be treated is not higher than atmospheric pressure—500 Torr.

On the other hand, in cases where a drying process is employed, it is possible to employ any processes in which the material to be treated is received in a vessel having an arbitrary size and treated in an oven, such as a kiln or equivalent heating device.

When the drying process is used, the treatment temperature is preferably in a range of from about 150 to about 400° C.

In the present invention, the low boiling-point component can be removed by spray drying. In this case, the plastics are sprayed preferably in the temperature range of from about 150 to about 400° C.

The low boiling-point component removed in this process step can include a low molecular weight component resulting from the decomposition of the plastics, plasticizers incorporated in the plastics, additives for the plastics, and reaction products, such as hydrogen chloride.

In the present invention, it is preferred that, during removal of the organic solvent(s), or both the organic solvent(s) and any low-boiling point component from the heat treated product (i.e., the treated solution or the mixed solution), a half or more by weight of the organic solvent(s) retained in the reaction vessel is removed, and more preferably, two thirds or more by weight of the organic solvent(s) retained in the reaction vessel is removed.

This is attributed to the fact that, by removing a half or more by weight of the organic solvent(s) retained in the reaction vessel, the grindability of the treated plastic product obtained after cooling and solidification becomes favorable, and furthermore, the secondary coagulation of the particles with each other can be prevented from occurring during and after grinding.

The weight of the organic solvent(s) retained in the reaction vessel above indicates the maximum weight of retention for the organic solvent(s) retained in the reaction vessel. For instance, in the case of a batch-type reaction vessel, in general, it is the weight of the organic solvent(s) fed into the reaction vessel before the initiation of the reaction.

The weight of the removed organic solvent(s) can be obtained by measuring the quantity of the processed plastics obtained after cooling and solidification, and by analyzing the amount of the organic solvent(s) incorporated into the processed plastics using gas chromatography or liquid chromatography.

In addition, the weight of the removed organic solvent(s) can be obtained by measuring the quantity of the liquid obtained by the removal, or by analyzing the amount of the liquid obtained after removal by means of gas chromatography or liquid chromatography.

It should be noted that the organic solvent(s) and the low boiling-point component need not be removed completely in this process step.

More specifically, the organic solvent(s) and the low boiling-point component may remain in the residue up to 50% by weight so long as the treated plastics obtained after cooling and solidification form a residue that yields excellent grindability, is capable of being readily ground into fine powder, and is capable of being transported easily.

Considering its use as fuel, it is also effective, but not necessary, to leave the solvent(s) in the residue to improve the flammability when used in boilers and the like.

According to the present invention, with a decreasing quantity of organic solvent(s) remaining in the processed plastics, the resulting processed plastics can be ground more easily while causing less coagulation. However, such a product requires strict conditions (i.e., high temperature and high vacuum) during the removal of the solvent(s). On the contrary, if the quantity of the organic solvent(s) remaining in the processed plastics is high, the transportation of the residue can be effected more easily, but the grinding of the resulting processed plastics becomes difficult, and, not only the ground product tends to undergo coagulation more easily, but also the solvent cost increases.

The organic solvent(s) and the low boiling-point component removed in the process step above can be reused in the aforementioned steps of mixing and heating.

Furthermore, as described hereinbefore, it is more preferred in the method of the present invention to remove the insoluble matter together with the organic solvent(s), or both of the organic solvent(s) and the low boiling-point component, from the heat treated product (i.e., the treated solution or the mixed solution) obtained in the mixing and heating steps above.

By removing the insoluble matter from the aforementioned heat treated product, processed plastics low in chlorine content can be obtained.

The insoluble matter can be removed by a solid-liquid separation, including, but not limited to filtration, stationary separation, or centrifugal separation. The removal of insoluble matter is preferably effected in a temperature range of from about 150 to about 400° C.

The insoluble matter to be removed include, in addition to inorganic matter such as glass and metal or paper, carbonaceous matter that are apt to be produced after a chlorine-containing plastics such as poly(vinyl chloride) is subjected to dehydrochlorination. The carbide is apt to include concentrated chlorine. Thus, according to the present invention, the chlorine content of the resulting processed plastics can be further reduced by removing the insoluble matter.

The temperature of the organic solvent(s), the low boiling-point component, and of the step for removing the insoluble matter, need not be the same as that of the preceding process steps of mixing and heating, but preferably, it is set higher than that of the mixing and heating steps, because the removal can be more easily performed.

The removal of the insoluble matter can be carried out after the aforementioned step of mixing and heating, and before the step of removing the organic solvent(s) and the low boiling-point component. Otherwise, it can be carried out after the step of removing the organic solvent(s) and the low boiling-point component. However, from the viewpoint of the viscosity of the treated product in the step of removing the insoluble matter, it is further preferred to be performed before the step of removing the low boiling-point component.

(5) Cooling and solidification

The method according to the present invention comprises solidifying the processed product after removing organic solvents, low boiling-point components, and insoluble matter.

For solidification, there is no particular limitations concerning the cooling method, and usable are, for instance, natural heat radiation, dropping into water, etc. The cooling rate after the removal of organic solvents, low boiling-point components, and insoluble matter is not particularly limited, but a higher cooling rate yields processed plastics that can be size-reduced more easily.

Thus, according to the present invention, the processed solution obtained by removing the organic solvent(s) or both the organic solvent(s) and the low boiling-point components is preferably solidified by cooling from the removal process temperature to about 100° C. or lower within about 10 minutes after starting cooling.

(6) Size reduction

The processed plastics obtained as a bulk after the cooling and solidification process are preferably size-reduced to obtain a powder having a desirable particle size.

The processed plastics obtained by the method according to the present invention can be size-reduced far more easily than unprocessed plastics.

Thus, the processed plastics obtained by the method according to the present invention can be size-reduced by any type of grinding and crushing machines. Applicable machines are, for example, a jaw crusher, a roll crusher, a ball mill, and a centrifugal mill.

The granularity of the product can be selected depending on the use of the processed plastics. Thus, by controlling the granularity, the product can be used as, for instance, raw materials and fuels, e.g., a reducing agent for ores such as iron ore, that is, a reducing agent for blast furnaces, as well as fuels for combustion to be used in boilers, kilns, and the like.

Furthermore, the product can be used as a solid fuel.

The present invention is described more specifically below by referring to non-limiting examples.

EXAMPLE 1

In stainless steel reaction vessels, each having an inner volume of 5 liters, were fed, as an organic solvent, 1,500 ml of creosote oil, (i.e., a distillate of a coal-based tar obtained from a coke furnace), together with 300 g each of polyethylene (film), polypropylene (platy), polystyrene (platy), and polyethylene terephthalate (fibrous). The film or platy samples were each cut into squares about 10×10 cm$^2$ in size, and the fibrous samples were cut into a length of about 10 cm. The vessel was heated by using a heater provided on the outer wall of the reaction vessel.

Chemical analyses for the mixed plastics composition using the four types of plastics above yielded 81% by weight of C, 11% by weight of H, and 8% by weight of O.

Once the treated product inside the reaction vessel attained a temperature of 280° C., an organic solvent (creosote oil) was refluxed at the same temperature for a duration of 2 hours. The plastics were mostly dissolved and a viscous liquid resulted.

The mixture thus obtained was subjected to reduced pressure distillation at 300° C. (under an absolute pressure of 50 Torr), and a pitch-like residue was obtained as a result of desolvent (inclusive of the removal of low boiling-point components). A black-colored coal-like solid (bulk) was finally obtained by cooling the pitch-like residue to room temperature (about 22° C.).

Then, 50 g of the black-colored solid lump was fed into a standard rotary blade grinding machine for grinding. The lump was found to be easily size-reduced, and fine powder consisting of particles having an average particle diameter of 1 mm was obtained in 20 seconds.

The conditions of the treatment as well as the test results, such as that of composition analysis obtained on the lump, observations during grinding, etc., are shown collectively in Table 1, and the chemical composition of the organic solvent used in the Example is given in Table 2.

The removal ratio of organic solvents (desolvent ratio) given in Table 1 is expressed by the ratio of the weight of removed organic solvent with respect to the weight of the organic solvent retained in the reaction vessel, i.e., the weight of the organic solvent fed into the reaction vessel before starting the reaction.

TABLE 1

| | | Example 1 |
|---|---|---|
| Quality of Added Plastics (g) | Polyethylene Film, about 100-m$^3$ square | 300 |
| | Polypropylene Platy, about 100-cm$^2$ square | 300 |
| | Polystyrene Pluty, about 100-cm$^3$ square | 300 |
| | Poly(vinyl chloride) Platy, about 100-cm$^3$ square | 0 |
| | Polyethylene terephthalate Fibrous, about 10-cm length | 300 |
| Organic solvent | Type | Creosote oil |
| | Amount added (ml) | 1500 |
| Heating or refluxing condition at mixed state | | Under reflux at 280° C. for 2 hours |
| State of treated solution after mixing and heating | | Viscous liquid Plastics mostly dissolve |
| Conditions for removing organic solvent/low boiling-point components | | Vacuum distillation at 300° C. and 50 Torr, Desolvent ratio: 87 wt. % |
| State of the resulting residue | | Pitch-like residue |
| Cooled Solid | Appearance | Black coal-like solid |
| | Compositon | |
| | Carbon (wt %) | 83 |
| | Hydrogen (wt. %) | 10 |

TABLE 1-continued

|  |  | Example 1 |
|---|---|---|
|  | Oxygen (wt. %) | 7 |
|  | Chlorine (wt. %) | 0 |
| Result of Grinding Test | Time to obtained ground product with average particle diameter of 1 mm (second) | 20 |

Note)
*Time of retention at the heating temperature defined in heating conditions
**Absolute pressure

TABLE 2

| | Composition of each solvent (% by weight) | | |
|---|---|---|---|
| | Creasote oil | Naphthalene wash oil | Crude naphtha oil |
| Single ring aromatic compound | 3 | 0 | 50 |
| Naphthalene | 5 | 14 | 0 |
| Double ring aromatic compound | 23 | 83 | 50 |
| Phenanthrene, anthracene | 9 | 1 | 0 |
| Three ring aromatic compound other than phenanthrene and anthracene | 34 | 2 | 0 |
| Pyrene | 1 | 0 | 0 |
| Four-ring aromatic compound other than pyrene | 25 | 0 | 0 |
| Boiling point of each solvent: | | | |

Creosote oil: 280° C.
Naphthalene wash oil: 200 to 250° C.
Crude naptha oil: 190 to 200° C.

EXAMPLES 2 TO 25 AND COMPARATIVE EXAMPLES 1 TO 3

A treatment process was carried out in the same manner as that described in EXAMPLE 1 to obtain lumps of solid, except for 1) using various types of mixed plastics differing in blend ratio and various types of organic solvents, and 2) changing the temperature elevation and retention conditions as well as the refluxing conditions and desolvent conditions.

In EXAMPLES 2 to 24, plastics were heat treated together with an organic solvent in mixed state, and solid insoluble matter was removed by carrying out hot filtration at the same temperature as that of heat treatment. Then, cooling and solidification were performed after removing the organic solvents and low boiling-point components from the processed solution.

In EXAMPLE 25, plastics and an organic solvent were heat treated in a mixed state, and after removing the organic solvent and low boiling-point component from the processed solution, hot filtration was performed at the same temperature as that of removing the organic solvent and low boiling-point component, which was followed by cooling and solidification.

In COMPARATIVE EXAMPLES 1 to 3, plastics and an organic solvent were heat treated in mixed state, and cooling and solidification were performed without subjecting the processed solution to the removal of the organic solvent and low boiling-point component.

Mixture of Plastics Used
(Type, Shape, Blending quantity)
Polyethylene: (film, in about 10×10 $cm^2$ squares); 300 g
Polypropylene: (platy, in about 10×10 $cm^2$ squares); 300 g
Polystyrene: (platy, in about 10×10 $cm^2$ squares); 300 g
Poly(vinyl chloride): (platy, in about 10×10 $cm^2$ squares); 300 g
Polyethylene terephthalate: (fibrous, about 10 cm in length); 300 g
(Chemical analysis of the mixed plastics)
C: 73% by weight, H: 9% by weight,
O: 7% by weight, Cl: 11% by weight
Organic Solvents Used
(1): Distillate of coal-based tar . . . Creosote oil, naphthalene wash oil, crude naphtha oil having the composition shown in aforementioned Table 2
(2): Coal-based tar
(3): Petroleum-based organic solvents . . . A oil, C oil, gas oil, kerosene.

Then, the lumps of solid obtained above were ground by using the same grinding machine described in EXAMPLE 1 above. Duration of grinding and the average particle diameter were measured.

The conditions of treatment and the test results obtained in the EXAMPLES and COMPARATIVE EXAMPLES are summarized in Tables 3-1 to 3-8 (EXAMPLES 2 to 25) and in Table 4 (COMPARATIVE EXAMPLES 1, 2, and 3).

The desolvent ratio given in Tables 3 and 4 is expressed by the ratio of the weight of removed organic solvent with respect to the weight of the organic solvent retained in the reaction vessel, i.e., the weight of the organic solvent fed into the reaction vessel before starting the reaction.

TABLE 3-1

| | | Example 2 | Example 3 | Example 4 |
|---|---|---|---|---|
| Organic Solvent | Type | Creasote oil | Creasote oil | Creasote oil |
| | Amount added (ml) | 1500 | 2000 | 3000 |
| Conditions at mixed state | Heating temp.: Time of Retention:* | Retained at 250° C. and 2 hours | Retained at 250° C. and 2 hours | Retained at 250° C. and 2 hours |
| State of treated solution after mixing and heating: Observation during | | Viscous liquid Plastics mostly | Viscous liquid Plastics mostly | Viscous liquid Plastics mostly |

TABLE 3-1-continued

|  |  | Example 2 | Example 3 | Example 4 |
|---|---|---|---|---|
| | mixing and heating: | dissolve<br>Generation of HCl | dissolve<br>Generation of HCl | dissolve<br>Generation of HCl |
| Conditions for removing organic solvent/low boiling-point components | Temperature | 300° C. | 300° C. | 300° C. |
| | Vacuum degree**: | 50 Torr | 50 Torr | 50 Torr |
| | Time***: | 2 hours | 2 hours | 2 hours |
| | Desolvent ratio: | 94 wt. % | 94 wt. % | 94 wt. % |
| State of the resulting residue: | | Pitch-like | Pitch-like | Pitch-like |
| Cooling condition of the residue:<br>Time elapsed to cool down to 100° C. from the temperature of the step for removing organic solvent/low boiling-point components (minute) | | 3.5 | 3.5 | 3.5 |
| Cooled Solid | Appearance | Black coal-like solid | Black coal-like solid | Black coal-like solid |
| | Composition | | | |
| | Carbon (wt %) | 83.2 | 82.1 | 81.4 |
| | Hydrogen (wt. %) | 8.5 | 10.7 | 11.6 |
| | Oxygen (wt. %) | 7.4 | 5.1 | 4.8 |
| | Chlorine (wt. %) | 0.9 | 2.1 | 2.2 |
| Result of Grinding Test | Time to obtain ground product with average particle diameter of 1 mm (second) | 17 | 21 | 18 |

Note)
*Time of retention under the heating temperature condition at the mixed state
**Absolute pressure
***Time under the temperature and vacuum degree conditions employed as the conditions for removing organic solvent/low boiling-point components.

TABLE 3-2

|  |  | Example 5 | Example 6 | Example 7 |
|---|---|---|---|---|
| Organic Solvent | Type | Creosote oil | Creosote oil | Creosote oil |
| | Amount added (ml) | 1500 | 2000 | 3000 |
| Conditions at mixed state | Heating temp.: | Under reflux at 280° C. and 2 hours | Retained at 180° C. and 2 hours | Retained at 250° C. and 0.5 hours |
| | Time of Retention:* | | | |
| State of treated solution after mixing and heating: Observation during mixing and heating: | | Viscous liquid<br>Plastics mostly dissolve<br>Generation of HCl | Viscous liquid<br>Plastics mostly dissolve<br>Generation of HCl | Viscous liquid<br>Plastics mostly dissolve<br>Generation of HCl |
| Conditions for removing organic solvent/low boiling-point components | Temperature | 280° C. | 280° C. | 280° C. |
| | Vacuum degree**: | 50 Torr | 50 Torr | 50 Torr |
| | Time***: | 2 hours | 2 hours | 0.5 hours |
| | Desolvent ratio: | 91 wt. % | 90 wt. % | 88 wt. % |
| State of the resulting residue | | Pitch-like | Pitch-like | Pitch-like |
| Cooling condition of the residue:<br>Time elapsed to cool down to 100° C. from the temperature of the step for removing organic solvent/low boiling-point components (minute) | | 3.5 | 3.5 | 3.5 |
| Cooled Solid | Appearance | Black coal-like solid | Black coal-like solid | Black coal-like solid |
| | Composition | | | |
| | Carbon (wt %) | 83.8 | 79.5 | 84.2 |
| | Hydrogen (wt. %) | 10.5 | 8.8 | 7.5 |
| | Oxygen (wt. %) | 6.2 | 6.0 | 6.1 |
| | Chlorine (wt. %) | 0.5 | 5.7 | 2.2 |
| Result of Grinding | Time to obtain ground product with average | 20 | 32 | 28 |

TABLE 3-2-continued

|  |  | Example 5 | Example 6 | Example 7 |
|---|---|---|---|---|
| Test | particle diameter of 1 mm (second) |  |  |  |

Note)
*Time of retention under the heating temperature condition at the mixed state
**Absolute pressure
***Time under the temperature and vacuum degree conditions employed as the conditions for removing organic solvent/low boiling-point components.

TABLE 3-3

|  |  | Example 8 | Example 9 | Example 10 |
|---|---|---|---|---|
| Organic Solvent | Type | Creosote oil | Creosote oil | Creosote oil |
|  | Amount added (ml) | 1500 | 1500 | 1500 |
| Conditions at mixed state | Heating temp.: Time of Retention:* | Retained at 250° C. and 4 hours | Retained at 250° C. and 2 hours | Retained at 250° C. and 2 hours |
| State of treated solution after mixing and heating: Observation during mixing and heating: |  | Viscous liquid Plastics mostly dissolve Generation of HCl | Viscous liquid Plastics mostly dissolve Generation of HCl | Viscous liquid Plastics mostly dissolve Generation of HCl |
| Conditions for removing organic solvent/low boiling-point components | Temperature Vacuum degree**: Time***: Desolvent ratio: | 280° C. 50 Torr 2 hours 95 wt. % | 300° C. 100 Torr 2 hours 89 wt. % | 300° C. 200 Torr 2 hours 85 wt. % |
| State of the resulting residue Cooling condition of the residue: Time elapsed to cool down to 100° C. from the temperature of the step for removing organic solvent/low boiling-point components (minute) |  | Pitch-like 3.5 | Pitch-like 3.5 | Pitch-like 3.5 |
| Cooled Solid | Appearance | Black coal-like solid | Black coal-like solid | Black coal-like solid |
|  | Composition |  |  |  |
|  | Carbon (wt %) | 84.7 | 83.0 | 83.1 |
|  | Hydrogen (wt. %) | 9.3 | 9.7 | 9.9 |
|  | Oxygen (wt. %) | 5.2 | 6.1 | 5.7 |
|  | Chlorine (wt. %) | 0.8 | 1.2 | 1.3 |
| Result of Grinding Test | Time to obtain ground product with average particle diameter of 1 mm (second) | 16 | 25 | 26 |

Note)
*Time of retention under the heating temperature condition at the mixed state
**Absolute pressure
***Time under the temperature and vacuum degree conditions employed as the conditions for removing organic solvent/low boiling-point components.

TABLE 3-4

|  |  | Example 11 | Example 12 | Example 13 |
|---|---|---|---|---|
| Organic Solvent | Type | Creosote oil | Creosote oil | Crude naphtha oil |
|  | Amount added (ml) | 1500 | 1500 | 1500 |
| Conditions at mixed state | Heating temp.: Time of Retention:* | Retained at 250° C. and 2 hours | Retained at 250° C. and 2 hours | Under reflux at 250° C. and 2 hours |
| State of treated solution after mixing and heating: Observation during mixing and heating: |  | Viscous liquid Plastics mostly dissolve Generation of HCl | Viscous liquid Plastics mostly dissolve Generation of HCl | Viscous liquid Plastics mostly dissolve Generation of HCl |
| Conditions for | Temperature | 300° C. | 300° C. | 300° C. |

TABLE 3-4-continued

|  |  | Example 11 | Example 12 | Example 13 |
|---|---|---|---|---|
| removing organic solvent/low boiling-point components | Vacuum degree**: | 50 Torr | 50 Torr | 50 Torr |
|  | Time***: | 2 hours | 2 hours | 2 hours |
|  | Desolvent ratio: | 93 wt. % | 94 wt. % | 92 wt .% |
| State of the resulting residue |  | Pitch-like | Pitch-like | Pitch-like |
| Cooling condition of the residue: Time elapsed to cool down to 100° C. from the temperature of the step for removing organic solvent/low boiling-point components (minute) |  | 5.0 | 10 | 3.5 |
| Cooled Solid | Appearance | Black coal-like solid | Black coal-like solid | Black coal-like solid |
|  | Composition |  |  |  |
|  | Carbon (wt %) | 82.5 | 81.1 | 83.0 |
|  | Hydrogen (wt. %) | 9.0 | 10.1 | 10.1 |
|  | Oxygen (wt. %) | 7.3 | 7.3 | 4.8 |
|  | Chlorine (wt. %) | 1.2 | 1.5 | 2.1 |
| Result of Grinding Test | Time to obtain ground product with average particle diameter of 1 mm (second) | 25 | 30 | 26 |

Note)
*Time of retention under the heating temperature condition at the mixed state
**Absolute pressure
***Time under the temperature and vacuum degree conditions employed as the conditions for removing organic solvent/low boiling-point components.

TABLE 3-5

|  |  | Example 14 | Example 15 | Example 16 |
|---|---|---|---|---|
| Organic Solvent | Type | Naphthalene wash oil | Coal-based Tar | 1:1 (by weight) mixture of coal-based tar and creosate oil |
|  | Amount added (ml) | 1500 | 1500 | 1500 |
| Conditions at mixed state | Heating temp.: | Under reflux at 250° C. and 2 hours | Retained at 250° C. and 2 hours | Retained at 250° C. and 2 hours |
|  | Time of Retention:* |  |  |  |
| State of treated solution after mixing and heating: Observation during mixing and heating: |  | Viscous liquid Plastics mostly dissolve Generation of HCl | Viscous liquid Plastics mostly dissolve Generation of HCl | Viscous liquid Plastics mostly dissolve Generation of HCl |
| Conditions for removing organic solvent/low boiling-point components | Temperature | 260° C. | 300° C. | 280° C. |
|  | Vacuum degree**: | 50 Torr | 50 Torr | 50 Torr |
|  | Time***: | 2 hours | 2 hours | 2 hours |
|  | Desolvent ratio: | 90 wt. % | 94 wt. % | 93 wt .% |
| State of the resulting residue |  | Pitch-like | Pitch-like | Pitch-like |
| Cooling condition of the residue: Time elapsed to cool down to 100° C. from the temperature of the step for removing organic solvent/low boiling-point components (minute) |  | 3.5 | 3.5 | 3.5 |
| Cooled Solid | Appearance | Black coal-like solid | Black coal-like solid | Black coal-like solid |
|  | Composition |  |  |  |
|  | Carbon (wt %) | 83.0 | 85.5 | 84.4 |
|  | Hydrogen (wt. %) | 10.1 | 8.5 | 9.8 |
|  | Oxygen (wt. %) | 4.8 | 3.9 | 5.8 |
|  | Chlorine (wt. %) | 2.1 | 2.1 | 1.0 |
| Result of Grinding | Time to obtain ground product with average | 26 | 22 | 20 |

TABLE 3-5-continued

|  |  | Example 14 | Example 15 | Example 16 |
|---|---|---|---|---|
| Test | particle diameter of 1 mm (second) |  |  |  |

Note)
*Time of retention under the heating temperature condition at the mixed state
**Absolute pressure
***Time under the temperature and vacuum degree conditions employed as the conditions for removing organic solvent/low boiling-point components.

TABLE 3-6

|  |  | Example 17 | Example 18 | Example 19 |
|---|---|---|---|---|
| Organic Solvent | Type | A oil | C oil | Gas oil |
|  | Amount added (ml) | 1500 | 1500 | 1500 |
| Conditions at mixed state | Heating temp.: Time of Retention:* | Retained at 250° C. and 2 hours | Retained at 250° C. and 2 hours | Under reflux at 250° C. and 2 hours |
| State of treated solution after mixing and heating: Observation during mixing and heating: |  | Viscous liquid Plastics mostly dissolve Generation of HCl | Viscous liquid Plastics mostly dissolve Generation of HCl | Viscous liquid Plastics mostly dissolve Generation of HCl |
| Conditions for removing organic solvent/low boiling-point components | Temperature Vacuum degree**: Time***: Desolvent ratio: | 280° C. 50 Torr 2 hours 92 wt. % | 300° C. 50 Torr 2 hours 94 wt. % | 250° C. 50 Torr 2 hours 94 wt. % |
| State of the resulting residue |  | Pitch-like | Pitch-like | Pitch-like |
| Cooling condition of the residue: Time elapsed to cool down to 100° C. from the temperature of the step for removing organic solvent/low boiling-point components (minute) |  | 3.5 | 3.5 | 3.5 |
| Cooled Solid | Appearance | Gray-colored solid | Black coal-like solid | Black coal-like solid |
|  | Composition |  |  |  |
|  | Carbon (wt %) | 81.0 | 81.6 | 81.1 |
|  | Hydrogen (wt. %) | 11.1 | 11.5 | 11.5 |
|  | Oxygen (wt. %) | 7.3 | 6.4 | 6.5 |
|  | Chlorine (wt. %) | 0.6 | 0.5 | 0.9 |
| Result of Grinding Test | Time to obtain ground product with average particle diameter of 1 mm (second) | 25 | 26 | 28 |

Note)
*Time of retention under the heating temperature condition at the mixed state
**Absolute pressure
***Time under the temperature and vacuum degree conditions employed as the conditions for removing organic solvent/low boiling-point components.

TABLE 3-7

|  |  | Example 20 | Example 21 | Example 22 |
|---|---|---|---|---|
| Organic Solvent | Type | Kerosene | Creosote oil | Creosote oil |
|  | Amount added (ml) | 1500 | 1500 | 2000 |
| Conditions at mixed state | Heating temp.: Time of Retention:* | Under reflux at 190° C. and 2 hours | Under reflux at 300° C. and 0.5 hour | Retained at 230° C. and 2 hours |
| State of treated solution after mixing and heating: Observation during mixing and heating: |  | Viscous liquid Plastics mostly dissolve Generation of HCl | Viscous liquid Plastics mostly dissolve Generation of HCl | Viscous liquid Plastics mostly dissolve Generation of HCl |
| Conditions for | Temperature | 250° C. | 300° C. | 300° C. |

TABLE 3-7-continued

|  |  | Example 20 | Example 21 | Example 22 |
|---|---|---|---|---|
| removing organic solvent/low boiling-point components | Vacuum degree**: | 50 Torr | 50 Torr | 50 Torr |
|  | Time***: | 2 hours | 2 hours | 2 hours |
|  | Desolvent ratio: | 93 wt. % | 87 wt. % | 88 wt. % |
| State of the resulting residue |  | Pitch-like | Pitch-like | Pitch-like |
| Cooling condition of the residue: Time elapsed to cool down to 100° C. from the temperature of the step for removing organic solvent/low boiling-point components (minute) |  | 3.5 | 3.5 | 3.5 |
| Cooled Solid | Appearance | Black coal-like solid | Black coal-like solid | Black coal-like solid |
|  | Composition |  |  |  |
|  | Carbon (wt %) | 78.5 | 82.0 | 82.3 |
|  | Hydrogen (wt. %) | 9.8 | 9.2 | 9.4 |
|  | Oxygen (wt. %) | 5.7 | 7.3 | 6.3 |
|  | Chlorine (wt. %) | 6.0 | 1.5 | 2.0 |
| 1.5 | Time to obtain ground product with average particle diameter of 1 mm (second) | 30 | 15 | 23 |

Note)
*Time of retention under the heating temperature condition at the mixed state
**Absolute pressure
***Time under the temperature and vacuum degree conditions employed as the conditions for removing organic solvent/low boiling-point components.

TABLE 3-8

|  |  | Example 23 | Example 24 | Example 25 |
|---|---|---|---|---|
| Organic Solvent | Type | Crude naphtha oil | Naphthalene wash oil | Creosote oil |
|  | Amount added (ml) | 3000 | 1500 | 1500 |
| Conditions at mixed state | Heating temp.: | Retained at 150° C. and 3 hours | Under reflux at 250° C. and 1 | Retained at 250° C. and 2 hours |
|  | Time of Retention:* |  |  |  |
| State of treated solution after mixing and heating: Observation during mixing and heating: |  | Viscous liquid Plastics mostly dissolve Generation of HCl | Viscous liquid Plastics mostly dissolve Generation of HCl | Viscous liquid Plastics mostly dissolve Generation of HCl |
| Conditions for removing organic solvent/low boiling-point components | Temperature | 180° C. | 280° C. | 300° C. |
|  | Vacuum degree**: | 50 Torr | 50 Torr | 50 Torr |
|  | Time***: | 2 hours | 2 hours | 2 hours |
|  | Desolvent ratio: | 90 wt. % | 89 wt. % | 94 wt. % |
| State of the resulting residue |  | Pitch-like | Pitch-like | Pitch-like |
| Cooling condition of the residue: Time elapsed to cool down to 100° C. from the temperature of the step for removing organic solvent/low boiling-point components (minute) |  | 3.5 | 3.5 | 3.5 |
| Cooled Solid | Appearance | Dark brown-colored solid | Black coal-like solid | Black coal-like solid |
|  | Composition |  |  |  |
|  | Carbon (wt %) | 80.4 | 81.3 | 83.1 |
|  | Hydrogen (wt. %) | 8.9 | 9.5 | 8.6 |
|  | Oxygen (wt. %) | 6.8 | 7.3 | 7.4 |
|  | Chlorine (wt. %) | 3.9 | 1.9 | 0.9 |

TABLE 3-8-continued

|  |  | Example 23 | Example 24 | Example 25 |
|---|---|---|---|---|
| 1.5 | Time to obtain ground product with average particle diameter of 1 mm (second) | 30 | 20 | 18 |

Note)
*Time of retention under the heating temperature condition at the mixed state
**Absolute pressure
***Time under the temperature and vacuum degree conditions employed as the conditions for removing organic solvent/low boiling-point components.

TABLE 4

|  |  | Comparative Example 23 | Comparative Example 24 | Comparative Example 25 |
|---|---|---|---|---|
| Quantity of Added Plastics (g) | Polyethylene Film, about 100-cm² square | 300 | 300 | 300 |
|  | Polypropylene Platy about 100-cm² square | 300 | 300 | 300 |
|  | Polystyrene Platy, about 100 cm² square | 300 | 300 | 300 |
|  | Poly(vinyl chloride) Platy, about 100-cm² square | 300 | 300 | 300 |
|  | Polyethylene terephthalate Fibrous, about 10-cm length | 300 | 300 | 300 |
| Organic Solvent | Type | Creosote oil | Mixed xylene | Creosote oil |
|  | Amount added (ml) | 1500 | 1500 | 1500 |
| Heating temp or refluxing condition at mixed state |  | Retained at 130° C. for 6 hours | Under reflux at 140° C. for 2 hours | Retained at 250° C. for 2 hours |
| State of treated solution after mixing and heating |  | Viscous liquid. A part of the plastics remain non-soluble. | Viscous liquid. A part of the plastics remain non-soluble. | Viscous liquid. Plastics mostly dissolve. |
| Conditions for removing organic solvent/low boiling-point components: |  | Vacuum distillation at 140° C. and 50 Torr** Desolvent ratio: 15 wt. % | Vacuum distillation at 140° C. and 50 Torr** Desolvent ratio: 97 wt. % | No desolvent or removal of low boiling-point component performed |
| State of the resulting residue: |  | Pitch-like residue | Pitch-like residue | — |
| Cooled Solid | Appearance | Brown-colored lump | Gray-colored lump | Wet brown-colored lump |
|  | Composition |  |  |  |
|  | Carbon (wt %) | 75.0 | 75.5 | 80.6 |
|  | Hydrogen (wt. %) | 8.5 | 8.7 | 10.0 |
|  | Oxygen (wt. %) | 6.5 | 6.3 | 6.9 |
|  | Chlorine (wt. %) | 10 | 9.5 | 2.5 |
| Results of Grinding Test |  | Average particle diameter after 30 seconds from starting grinding was 10 mm or larger. Fusion occurred with further continuation of grinding. | Average particle diameter after 30 seconds from starting grinding was 10 mm or larger. Fusion occurred with further continuation of grinding. | Average particle diameter after 30 seconds from starting grinding was as large as 1.5 mm. The powder was obtained in a wet state and tended to agglomerate. |

Note)
*Time of retention at the heating temperature defined in heating conditions
**Absolute pressure

COMPARATIVE EXAMPLE 4

By feeding into a rotary blade grinding machine, attempts of grinding were made on 10-g portions each of polyethylene (film, in squares about 1×1 cm² in size), polypropylene (platy, in squares about 1×1 cm² in size), polystyrene (platy, in squares about 1×1 cm² in size), poly(vinyl chloride) (platy, in squares about 1×1 cm² in size), and polyethylene terephthalate (fibrous, about 10 cm in length).

However, film and fibrous plastics were found to tangle with the rotary blade as to make grinding unfeasible.

As is described above with reference to EXAMPLES 1 to 25, the processed plastics according to the present invention excel in grindability, and contain very little chlorine.

In contrast to the above examples, in the case in which the organic solvent and the low boiling-point components were not removed (COMPARATIVE EXAMPLE 3) it is found that the processed plastic is high in chlorine concentration, inferior in grindability, and is apt to undergo coagulation.

The processed plastics according to the present invention are usable as a reducing agent of iron ore and solid fuels of boilers and ovens such as kilns.

As shown above, the present invention provides a method for treating plastics which comprises mixing plastics with at least one organic solvent at a specified temperature or higher, allowing the plastics to dissolve and/or swell, removing the at least one organic solvent or both the organic solvent(s) and any low-boiling point components from the treated solution thereafter, and solidifying the resulting product; and a solid fuel and/or a reducing agent obtained by this treatment method.

According to the present invention, various problems encountered in the direct grinding process of waste plastics can be greatly reduced or avoided.

As described above, the present invention has excellent effects as follows:

Direct pulverization of, for instance, plastics about 1×1 to 2×2 mm$^2$ in size is no longer necessary. The present invention allows use of particles capable of being dissolved in a solvent, i.e., having a size up to, or greater than, about 10×10-cm$^2$, as the feed source for the processing of plastics.

Secondly, the processed plastics obtained after removing the organic solvent(s) and the low boiling-point components after heat treatment can be finely pulverized extremely easily, and excels in grindability.

Thirdly, films and fibrous plastics can be treated simultaneously with other types plastics differing in shape.

Furthermore, halide-containing plastics such as poly(vinyl chloride) can be treated simultaneously with other types of plastics.

More specifically, dehydrochlorination can be performed under mild conditions, and the separation of the generated hydrogen chloride can be easily performed. Furthermore, by performing dehydrochlorination in the presence of a solvent, a product can be obtained with a lower viscosity as compared with poly(vinyl chloride) subjected to dechlorination free of solvents. Thus, the product is superior because it can be freed from problems concerning transportation.

In addition, the processed plastics according to the present invention exhibit an extremely superior grindability. Thus, fine powder substantially free from chlorine can be obtained, and this product can be used as a fuel or a reducing agent that has improved combustibility, and yet, is free from the problems of environmental pollution.

Furthermore, the method according to the present invention is applicable in a continuous treatment process. Accordingly, the method need not use complicated and expensive equipment and apparatuses, and is furthermore capable of scaling up to mass treatment by using a larger reaction vessel. It can be seen that this method is also advantageous from an economical point of view.

While the invention has been described in detail and with reference to specific embodiments thereof, it will be apparent to one skilled in the art that various changes and modifications can be made therein without departing from the spirit and scope thereof.

What is claimed is:

1. A method for treating plastics, comprising:
   mixing the plastics with at least one organic solvent at a temperature not lower than about 150° C.;
   allowing the plastics to dissolve and/or swell;
   removing the at least one organic solvent or both the at least one organic solvent and any low-boiling point component from the treated solution; and
   solidifying the resulting product.

2. The method for treating plastics of claim 1, wherein, in removing the at least one organic solvent or both the at least one organic solvent and a low-boiling point component from said treated solution, a half or more by weight of the at least one organic solvent retained in the reaction vessel is removed.

3. The method for treating plastics of claim 1, wherein said treated solution obtained by removing the at least one organic solvent or both the at least one organic solvent and any low-boiling point component therefrom is cooled for solidification from the treatment temperature at the time of removal to about 100° C. or lower within about 10 minutes after starting cooling.

4. The method for treating plastics of claim 1, further comprising grinding said resulting product.

5. The method for treating plastics of claim 1, wherein said at least one organic solvent is at least one solvent selected from the group consisting of a coal-based tar, a distilled product obtained from coal-based tar, and a petroleum-based organic solvent.

6. The method for treating plastics of claim 5, wherein said distilled product obtained from coal-based tar is at least one product selected from the group consisting of crude naphtha oil, naphthalene wash oil, creosote oil, and anthracene oil.

7. The method for treating plastics of claim 5, wherein said petroleum-based organic solvent is at least one solvent selected from the group consisting of A oil, C oil, gas oil, fuel oil, heavy oil and kerosene.

8. The method for treating plastics of claim 1, wherein said plastics include a chlorine-containing plastic.

9. A solid fuel made of processed plastics obtained by the method of claim 1.

10. A reducing agent for ores made of processed plastics obtained by the method of claim 1.

11. A method for treating plastics, comprising:
    mixing the plastics with at least one organic solvent at a temperature not lower than about 150° C.;
    allowing the plastics to dissolve and/or swell;
    removing an insoluble portion from the resulting treated solution;
    removing the at least one organic solvent or both the at least one organic solvent and any low-boiling point component from the treated solution; and
    solidifying the resulting product.

12. The method for treating plastics of claim 11, wherein, in removing the at least one organic solvent or both the at least one organic solvent and a low-boiling point component from said treated solution, a half or more by weight of the at least one organic solvent retained in the reaction vessel is removed.

13. The method for treating plastics of claim 11, wherein said treated solution obtained by removing the at least one organic solvent or both the at least one organic solvent and any low-boiling point component therefrom is cooled for solidification from the treatment temperature at the time of removal to about 100° C. or lower within about 10 minutes after starting cooling.

14. The method for treating plastics of claim 11, further comprising grinding said resulting product.

15. The method for treating plastics of claim 11, wherein said at least one organic solvent is at least one solvent selected from the group consisting of a coal-based tar, a distilled product obtained from coal-based tar, and a petroleum-based organic solvent.

16. The method for treating plastics of claim 15, wherein said distilled product obtained from coal-based tar is at least one product selected from the group consisting of crude naphtha oil, naphthalene wash oil, creosote oil, and anthracene oil.

17. The method for treating plastics of claim 15, wherein said petroleum-based organic solvent is at least one solvent selected from the group consisting of A oil, C oil, gas oil, fuel oil, heavy oil and kerosene.

18. The method for treating plastics of claim 11, wherein said plastics include a chlorine-containing plastic.

19. A solid fuel made of processed plastics obtained by the method of claim 11.

20. A reducing agent for ores made of processed plastics obtained by the method of claim 11.

21. A method for treating plastics, comprising:

mixing the plastics with at least one organic solvent at a temperature not lower than about 150° C.;

allowing the plastics to dissolve and/or swell;

removing the at least one organic solvent or both the at least one organic solvent and any low-boiling point component from the treated solution;

removing the insoluble portion from the resulting treated solution; and solidifying the resulting product.

22. The method for treating plastics of claim 21, wherein, in removing the at least one organic solvent or both the at least one organic solvent and a low-boiling point component from said treated solution, a half or more by weight of the at least one organic solvent retained in the reaction vessel is removed.

23. The method for treating plastics of claim 21, wherein said treated solution obtained by removing the at least one organic solvent or both the at least one organic solvent and any low-boiling point component therefrom is cooled for solidification from the treatment temperature at the time of removal to about 100° C. or lower within about 10 minutes after starting cooling.

24. The method for treating plastics of claim 21, further comprising grinding said resulting product.

25. The method for treating plastics of claim 21, wherein said at least one organic solvent is at least one solvent selected from the group consisting of a coal-based tar, a distilled product obtained from coal-based tar, and a petroleum-based organic solvent.

26. The method for treating plastics of claim 25, wherein said distilled product obtained from coal-based tar is at least one product selected from the group consisting of crude naphtha oil, naphthalene wash oil, creosote oil, and anthracene oil.

27. The method for treating plastics of claim 25, wherein said petroleum-based organic solvent is at least one solvent selected from the group consisting of A oil, C oil, gas oil, fuel oil, heavy oil and kerosene.

28. The method for treating plastics of claim 21, wherein said plastics include a chlorine-containing plastic.

29. A solid fuel made of processed plastics obtained by the method of claim 21.

30. A reducing agent for ores made of processed plastics obtained by the method of claim 21.

31. A method for treating plastics, comprising:

mixing the plastics with at least one organic solvent at a temperature of at least about 150° C.;

allowing the plastics to dissolve and/or swell;

removing at least a portion of the at least one organic solvent from the treated solution;

solidifying the resulting product; and grinding the solidified product to produce a fine powder substantially free of chlorine.

* * * * *